United States Patent [19]
Dangler et al.

[11] Patent Number: 5,283,861
[45] Date of Patent: Feb. 1, 1994

[54] REMOTE CONTROL OF A LOCAL PROCESSOR CONSOLE

[75] Inventors: Mary K. Dangler, Endicott; Samuel L. Wentz, Endwell, both of N.Y.

[73] Assignee: International Business Machines Corporation, Armonk, N.Y.

[21] Appl. No.: 575,746

[22] Filed: Aug. 31, 1990

[51] Int. Cl.$^5$ ........................................... G06F 15/401
[52] U.S. Cl. .................................. 395/149; 395/153; 345/1
[58] Field of Search ....................... 395/148, 149, 153; 340/717, 711

[56] References Cited

U.S. PATENT DOCUMENTS

| | | | |
|---|---|---|---|
| 4,064,561 | 12/1977 | Jennings | 364/900 |
| 4,479,122 | 10/1984 | Redman et al. | 340/825.06 |
| 4,646,261 | 2/1987 | Ng | 364/900 |
| 4,665,501 | 5/1987 | Saldin et al. | 364/900 |
| 4,714,989 | 12/1987 | Billings | 364/200 |
| 4,792,888 | 12/1988 | Agarwal et al. | 364/188 |
| 4,809,217 | 2/1989 | Floro et al. | 364/900 |
| 4,809,220 | 2/1989 | Carlson et al. | 364/900 |
| 4,816,988 | 3/1989 | Yamanaka | 364/188 |
| 4,845,658 | 7/1989 | Gifford | 364/900 |
| 4,860,379 | 8/1989 | Schoeneberger | 455/5 |
| 4,873,643 | 10/1989 | Powell et al. | 364/468 |
| 4,897,801 | 1/1990 | Kazama et al. | 364/521 |
| 4,939,509 | 7/1990 | Bartholomew et al. | 340/717 |
| 4,965,560 | 10/1990 | Riley | 340/717 |
| 5,091,868 | 2/1992 | Pickens et al. | 395/148 |

FOREIGN PATENT DOCUMENTS

| | | |
|---|---|---|
| 0408391 | 1/1991 | European Pat. Off. . |
| 62-25327 | 2/1987 | Japan . |
| 2052210 | 6/1980 | United Kingdom . |
| 2202064 | 9/1988 | United Kingdom | G4A/9 |

OTHER PUBLICATIONS

Carl Malamud, Terminal or Workstation? Evaluating the X Factor, Apr. 1990, Data Communications International, pp. 33-34.

Irene McCartney, Xcellence in windows: advantages of a standard Mini-Micro Systems, Jul. 1987, pp. 139-141.

*Primary Examiner*—Gary V. Harkcom
*Assistant Examiner*—Joseph H. Feild
*Attorney, Agent, or Firm*—Arthur J. Samodovitz

[57] ABSTRACT

A first processor console includes a first display screen and a first storage device for storing panel templates containing fixed panel information for display on the first display screen. A second processor console includes a second display screen and a second storage device for storing panel templates containing fixed panel information for display on the second display screen. The first processor console transmits to the second processor console an identification of a panel template for display on the second display screen. The second processor console receives the panel template identification, determines if the panel template identification identifies a panel stored in the second storage means and displays the panel on the second display screen if the identification identifies a panel stored in the second storage device, and requests transmission of the identified panel template if the second storage device does not contain the identified panel template. The first processor console also transmits variable information to the second processor console for merger with the identified panel template. The first and second processor consoles utilize standard operating systems to participate in the remote operations.

13 Claims, 14 Drawing Sheets

FIG.3(A)a

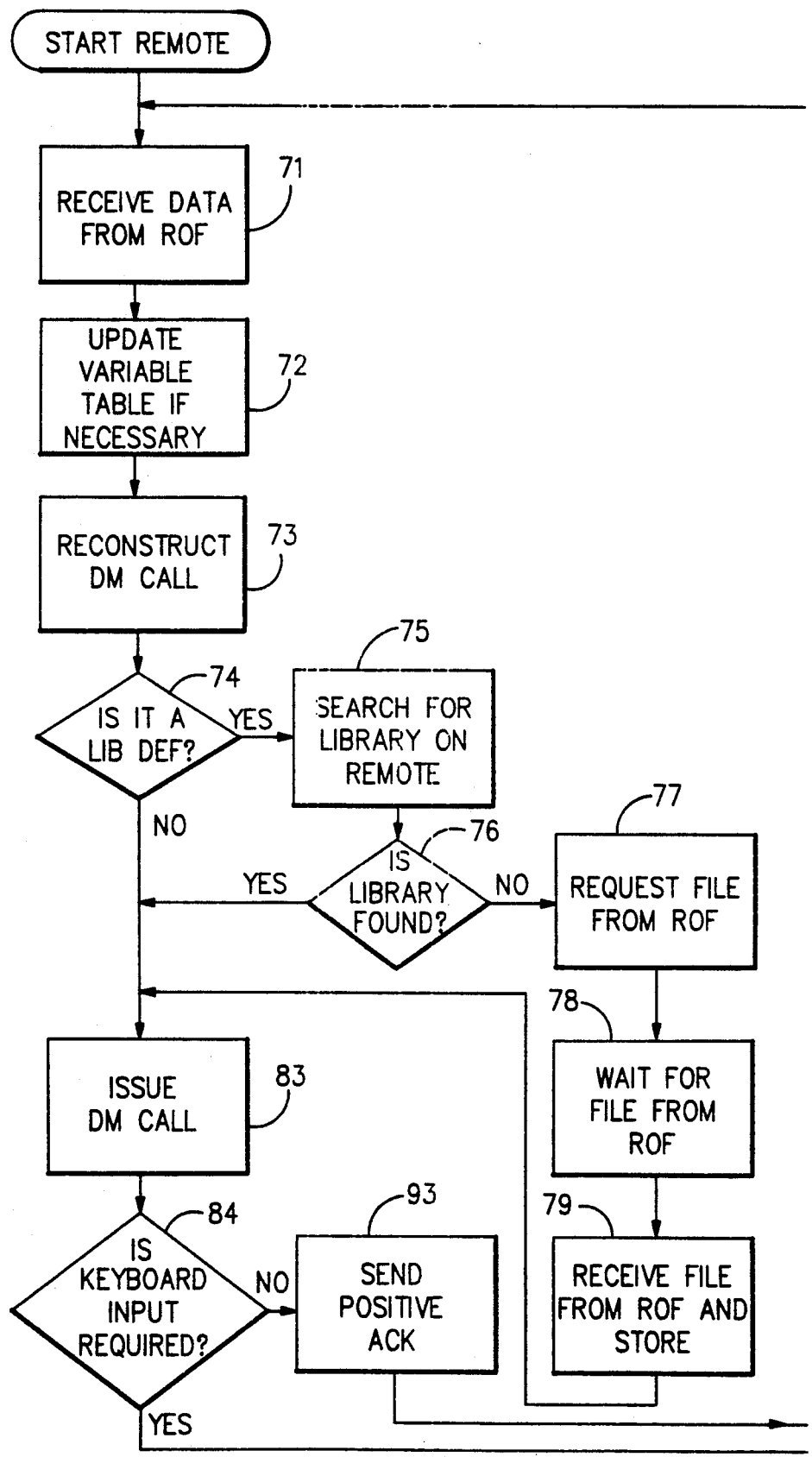
FIG.3(B)a

FIG.3(B)b

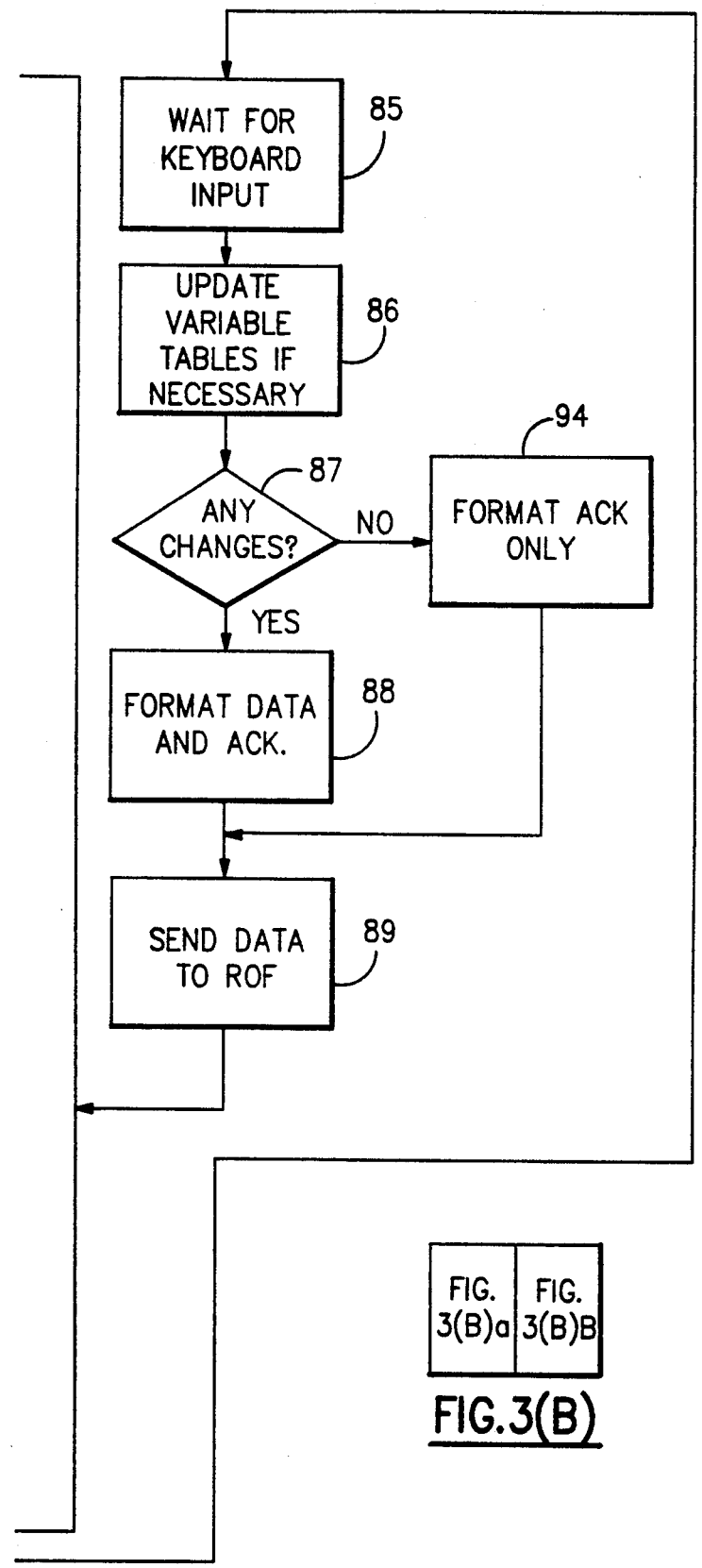
FIG.3(B)b

REMOTE CONTROL OF A LOCAL PROCESSOR CONSOLE

BACKGROUND OF THE INVENTION

The invention relates generally to computer systems, and deals more particularly with remote control of a local processor console and an application program running on the local processor console, and parallel display of application panels on a remote processor console and the local processor console.

Heretofore, remote control of a local processor console and an application running on a local processor console has been provided by connecting a remote processor console to the local processor console via a telephone line, and sending a data stream representing the local processor console display to the remote processor console. For example, a prior art local processor console within an IBM System/370 computer system was remotely controlled by sending an IBM "3270" data stream to a remote (dumb) IBM 3275 terminal in addition to the local (dumb) IBM 3272 terminal. An IBM "3270" data stream is a data stream which directly controls the console display. The 3270 data stream comprises for each field on the screen, information defining the type of field, the location of the field and the content of the field, for example, an alphanumeric character. While this arrangement permitted remote control of the local processor console and parallel display on the local processor console and the remote processor console, the speed of presentation of display on the remote processor console is limited by the transmission speed over the telephone line. Because the remote processor console in this example is dumb and requires the 3270 data stream, a large amount of data must be sent from the local processor console to control the remote processor console screen. Therefore, the remote processor console is subject to slow operation.

In the same session of the aforesaid System/370 computer system, an operator at the remote processor console could enter data or commands through the remote processor console keyboard. In response, terminal hardware within the remote processor console determines which fields are changed and sends information defining only the changed fields to the local processor console. This information is in the form of a 3270 data stream. The application running in the local processor console then processes the information and takes appropriate action, for example, updating the local and remote processor console screens by sending the 3270 data streams for the entire screen or changed portions as appropriate.

The aforesaid local processor console is also used in a different session as a dumb terminal for controlling an application running in the System/370 host processor. During this session, the host processor communicates with the local processor console with the 3270 data stream.

Still another prior art IBM System/370 computer system comprises a host processor, a personal computer coupled to the host processor by a local area network or a telephone line, and a remote processor console coupled to the local personal computer by a local area network or a telephone line. The personal computer includes software to act as a communications manager to couple the host processor to the aforesaid remote processor console (or another remote console similarly coupled by a local area network or a telephone line). In this prior art system, the software is IBM's "Gateway" program. The host processor runs an application and transmits the 3270 data stream to the personal computer, and the communications manager routes the 3270 data stream to the proper remote processor console which then acts as a dumb terminal.

In another prior art system, IBM's 4381 computer system, an application running on a local processor console (serving a host processor) makes function calls to cause a display. The function calls are written in SPIL high-level language, and are received by a language interpreter in the operating system of the local processor console. The language interpreter breaks down the high-level calls into many corresponding low-level calls including the 3270 data stream (and an address of an error handling routine), which low-level calls are passed through a first common adapter code (CAC) program in the local processor console. The language interpreter then determines if a remote processor console coupled to the local processor console is operable, and if so, invokes a common communications adapter (CAC) program which is a second type of CAC program responsible for communicating with the remote processor console through a communication link. Then, the first CAC program sends the 3270 data stream to the second CAC program, and the second CAC program sends the 3270 data stream to a receiver at the remote processor console (an IBM 3275 dumb terminal). Then, the first CAC program in the local processor console transmits the 3270 data stream to the local processor console screen, and the receiver at the remote processor console transmits the 3270 data stream to the remote processor console screen. Also, in this IBM 4381 computer system, the remote processor console can receive inputs from the keyboard of the remote processor console, and keystroke information in the form of short encoded transmissions are sent directly to the local processor console. Then, the keystroke information is received by the local processor console which processes the keystroke information and generates a 3270 data stream to update the local console screen as described above.

The local processor console (a UC.5 computer) of the IBM 4381 computer system can be operated in either of two modes, a manual function mode or a host operating system mode. In the manual function mode, code running above the operating system in the local processor console controls the screens of both the local processor console and the remote processor console. Keyboard information can originate from either the remote processor console keyboard or the local processor console keyboard, and keyboard control was made from the respective processor console. The keyboard information passes through the language interpreter in the local processor console, and then the first CAC program in the local processor console to the application running in the local processor console. In the operating system mode, the operating system of the host processor controls both the screens. The 3270 data stream information originates from the host operating system and is passed to the local processor console through a local channel adapter including hardware and a third CAC program which stores the 3270 data stream in the processor console. Then, the 3270 data stream is sent to the local console screen and the remote processor console screen.

In another prior art system (prior art under U.S. law), IBM's 308X remote support system, an IBM UC.5 computing engine served as a processor console for a main frame computer and another system 370 main-frame computer provided remote control of the UC.5 computing engine. Screens were displayed almost simultaneously at both the UC.5 computing engine site and at the remote site. Each site included a collection of templates containing fixed information for the screens, and to make a display at the remote site, the UC.5 computing engine sent an identification of the desired template and variable data to be merged into the template. The remote site included a table to map the variable information into the proper locations in the template. While the storage of the collection of templates at the local and remote sites reduced the amount of data transfer, there were draw backs to this system. The UC.5 computing engine ran low level code that included a merged combination of single line application and control commands. There was a command facility that received display-related (and other) single line codes. Another facility determined if the remote site was operable. If so, these display-related commands were routed to the remote site to control the remote display. These commands also caused the same display at the local site. Thus, the body of code was specific to the application. Also, the collection of templates was included in the microcode at both sites and when a template required change, the microcode at both locations was rewritten to incorporate the change. Moreover, the templates could only accept variable data of predefined length.

A general object of the present invention is to provide efficient remote control of a local processor and an application running on the local processor, and parallel display of application panels on a local processor console and a remote processor console.

Another general object of the present invention is to provide remote control and parallel display of the foregoing object yet provide flexibility and standardization in the implementation.

SUMMARY OF THE INVENTION

The invention resides in a computer system and network in which a remote processor console efficiently controls operation of a local processor console and an application running on the local processor console.

The computer system or network comprises a first processor console including a first display screen and a first storage device for storing at least one panel template containing fixed panel information for display on the first display screen, a second processor console includes a second display screen and a second storage device for storing at least one panel template containing fixed panel information for display on the second display screen.

The two processor consoles are coupled by a communication facility. The first processor console further includes a program or hardware for transmitting to the second processor via the communication facility and identification of a panel template for display on the second display screen. The second processor console includes a second program or hardware for receiving the panel template identification, determining if the panel template identification identifies a panel stored in the second storage device, and displaying the identified panel on the second display screen if the identification identifies a panel stored in the second storage device and requesting transmission of the identified panel if the second storage device does not contain the identified panel template. Upon receipt of the requested panel template, the second operating system displays the identified panel template on the second display screen. The first program or hardware contained in the first processor console also transmits variable information to the second program or hardware and directs a merger of the variable information with the identified panel template for display on the second display screen. The second program means also receives keyboard input from the second processor console and transmits it to the first processor console where it substitutes directly for keyboard inputs made via the first processor console.

According to one feature of the invention, a first operating system within the local processor consoles controls the operation of the first display stream, and a second operating system within the remote processor console controls the operation of the second display stream. An application running in the local processor console makes an operating system type of call to the first program to make a display, and the first program extracts call data from the operating system type of call and transmits the call data to the remote processor console. The second program receives the call data from the first program, converts the call data to an operating system type of call, and passes the operating system type of call to the second operating system to make a display on the second display stream. The call data defines the variable information, and may identify the panel template if each of the memories contains a plurality of panel templates. In addition, the operating system type of call includes a function command such as a command to display the panel template and variable information.

BRIEF DESCRIPTION OF THE FIGURES

FIG. 3 (A) illustrates a process performed by a remote operator facility in the local processor console, and FIG. 3 (B) illustrates an associated process performed by a remote processor console support in the remote processor console.

DETAILED DESCRIPTION OF THE PREFERRED EMBODIMENT

Figure 1:
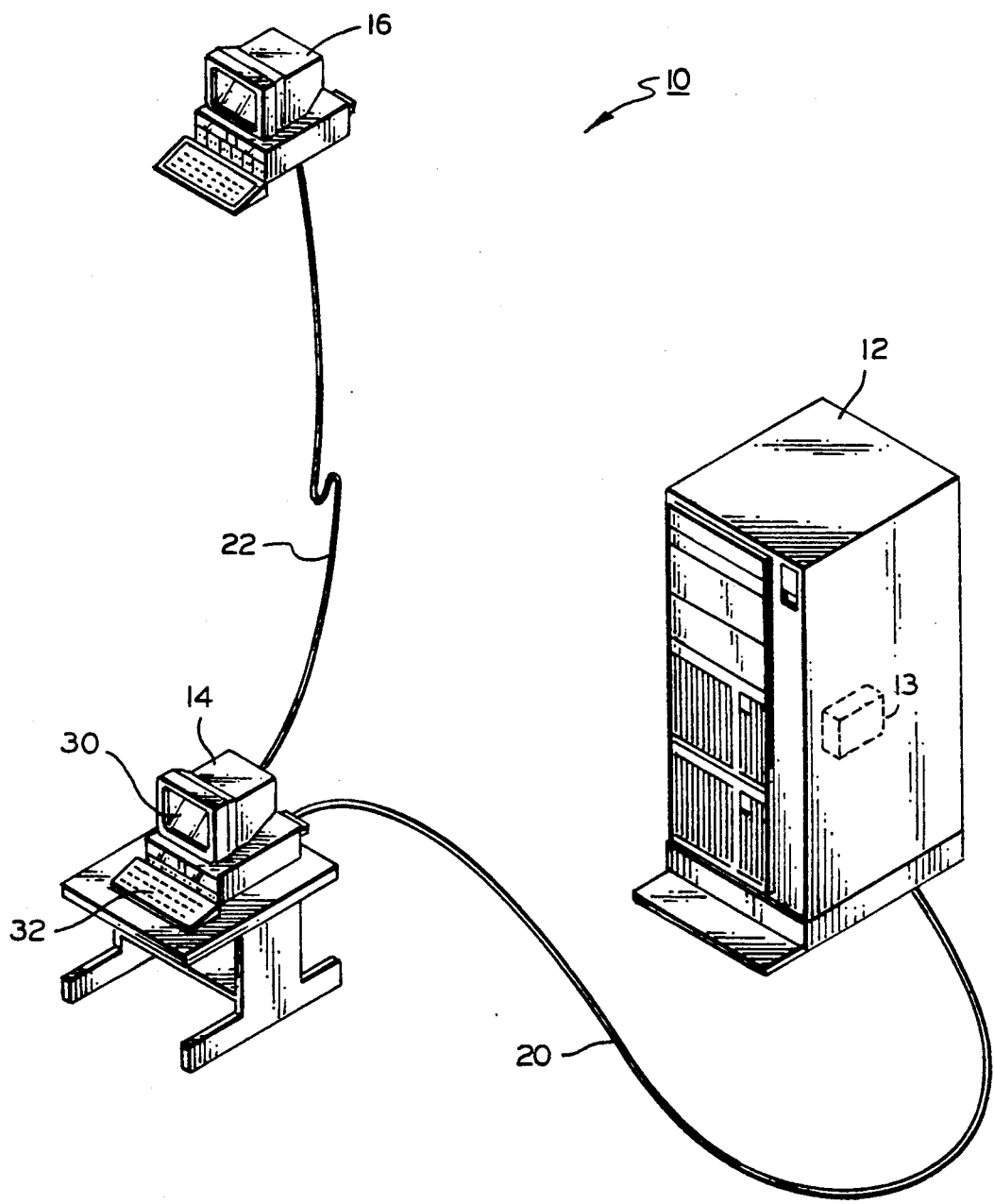
FIG. 1 is a perspective view of a computer system including the present invention.
Figures 2, 2A:
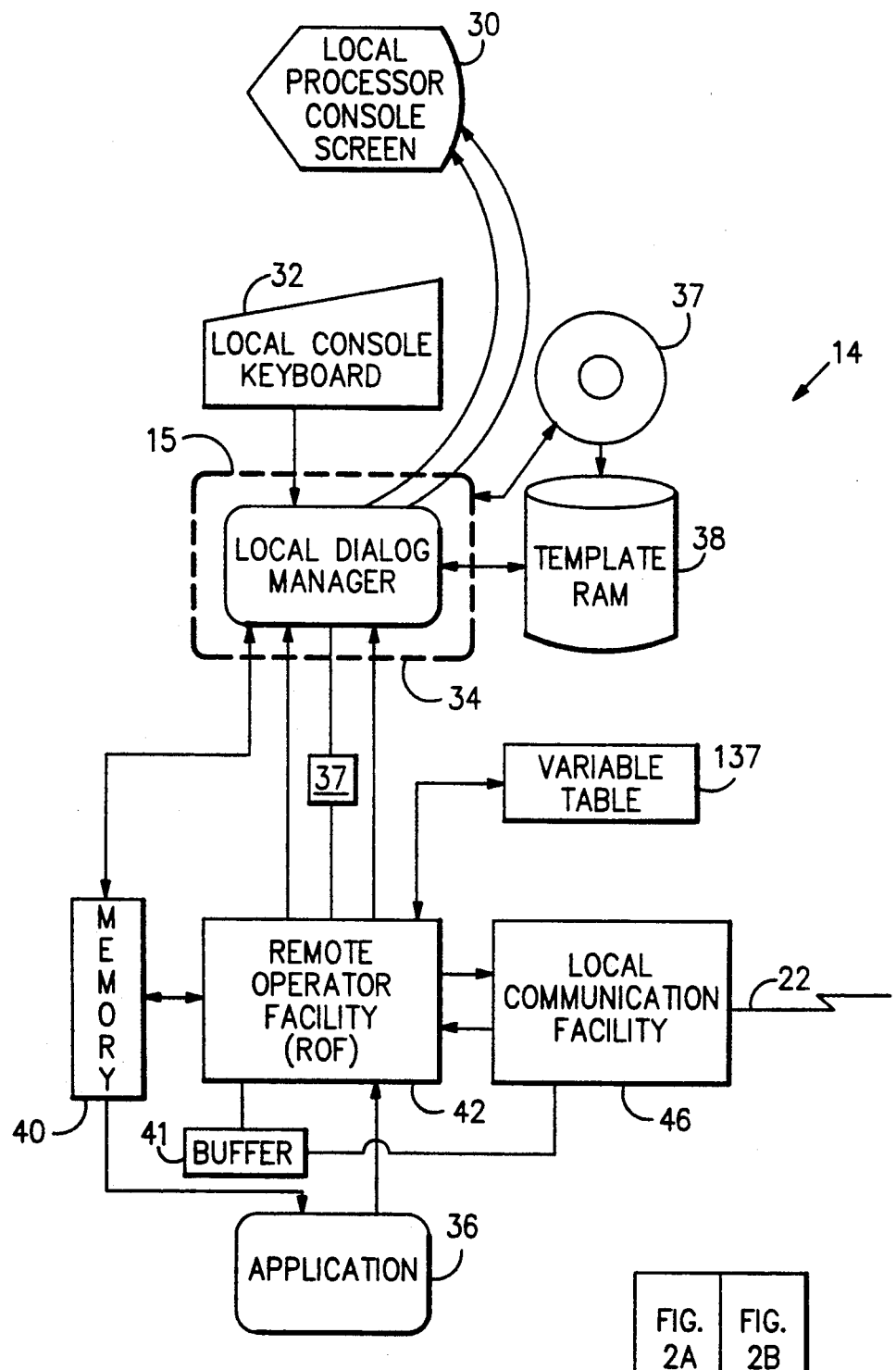
FIGS. 2, 2A and 2B represent a high level block diagram of components implementing the present invention within the computer system of FIG. 1.
Figure 2B:
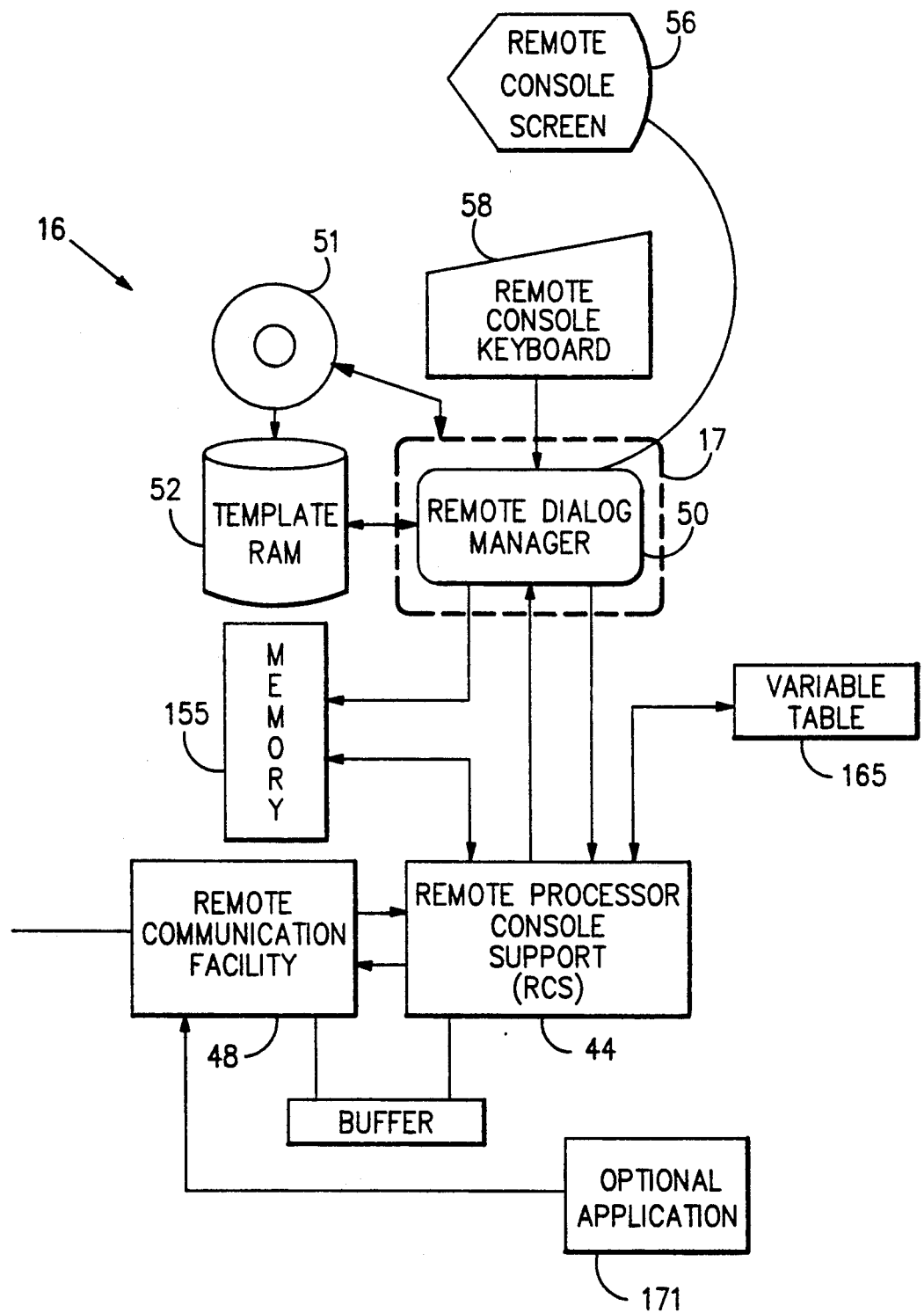

Referring now to the drawings in detail wherein like reference numerals indicate like elements throughout the several views, FIG. 1 illustrates a computer network generally designated 10 which includes the present invention. Network 10 includes a main or host computer 12 and a local processor console or terminal 14 which serves the main computer, i.e. provides operational control, diagnostic and testing services for the host, and a remote processor console or terminal 16 for remote control of the local processor console. At other times, or simultaneously, remote processor console serves as an independent computer and runs other applications. The main computer 12 includes a processor 13, and by way of example is an IBM System/370 computer. In the illustrated example, local processor console 14 functions as a smart terminal, i.e. can process keyboard inputs via a local keyboard 32 to directly control displays on a screen 30, and computer 12 is coupled to the local processor console by a dedicated line 20. By way of example, local processor console 14 is an IBM PS/2 personal computer using an OS/2 operating system 15 (FIG. 2). The OS/2 operating system includes a Dialog Manager program 34 (FIG. 2) which controls the user interface, and a Presentation Manager program 35 for which Dialog Manager is a high level application program interface. For further details of the OS/2 operating system, reference can be made to "IBM OS/2 Standard Edition Version 1.2 Getting Started". For further details of the Dialog Manager program and the Presentation Manager function within the OS/2 operating system, reference can be made to "IBM OS/2 1.2 Dialog Manager Guide and Reference". In the illustrated example, the remote terminal 16 is also a smart terminal, and is coupled to the local processor console via a nondedicated telephone line 22 or LAN. By way of example, remote processor console 16 is also an IBM PS/2 personal computer using an OS/2 operating system 17 (FIG. 2).

FIG. 2 illustrates specific components of local processor console 14 and remote processor console 16 which relate to remote operations according to the present invention. Local operating system 15 includes a Dialog Manager component 34 which receives keyboard inputs from keyboard 32, and controls the display on screen 30 according to direction from an application 36 running on a processor 37 within processor console 14. By way of example, the application runs a diagnostic program for host computer 12. However, it should be understood that the remote operations according to the present invention are equally applicable when processor console 14 is independent of host computer 12. In the illustrated example, many of the displays for screen 30 (and a corresponding screen 56 on remote processor console 16) are panels each of which comprises a template of fixed information such as categories or questions of a menu panel, and variable information which fits into positions within these templates and is specific to each instance of the panel. The fixed template information for all applications is stored on hard disk 37 and grouped by library; one library contains all the templates required by one application. The variable information can be supplied either by application 36 or an operator through local processor keyboard 32 and stored in RAM portion 40. When application 36 makes a command to display a template and this command is received by local Dialog Manager program 34, local Dialog Manager program 34 fetches the template from hard disk 37 and stores it in RAM portion 38 for direct access.

Figure 3A:
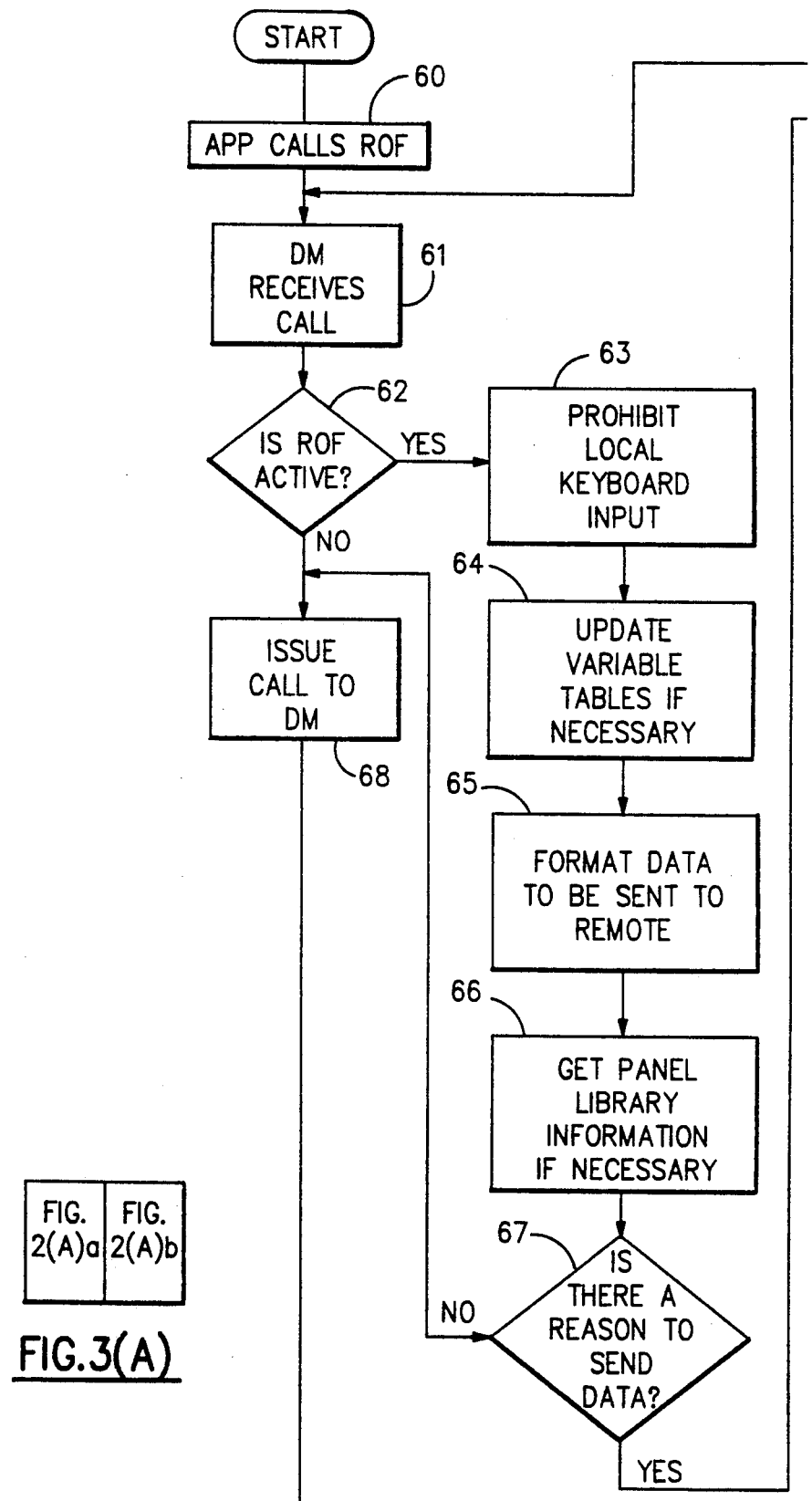
FIGS. 3 (A), 3(A)a, 3(A)b and 3(B), 3(B)a, 3(B)b are flow charts illustrating usage of the computer system components of FIG. 2 to implement remote control of a local processor console and parallel displays on the local processor console and a remote processor console, according to the present invention.
Figure 3B:
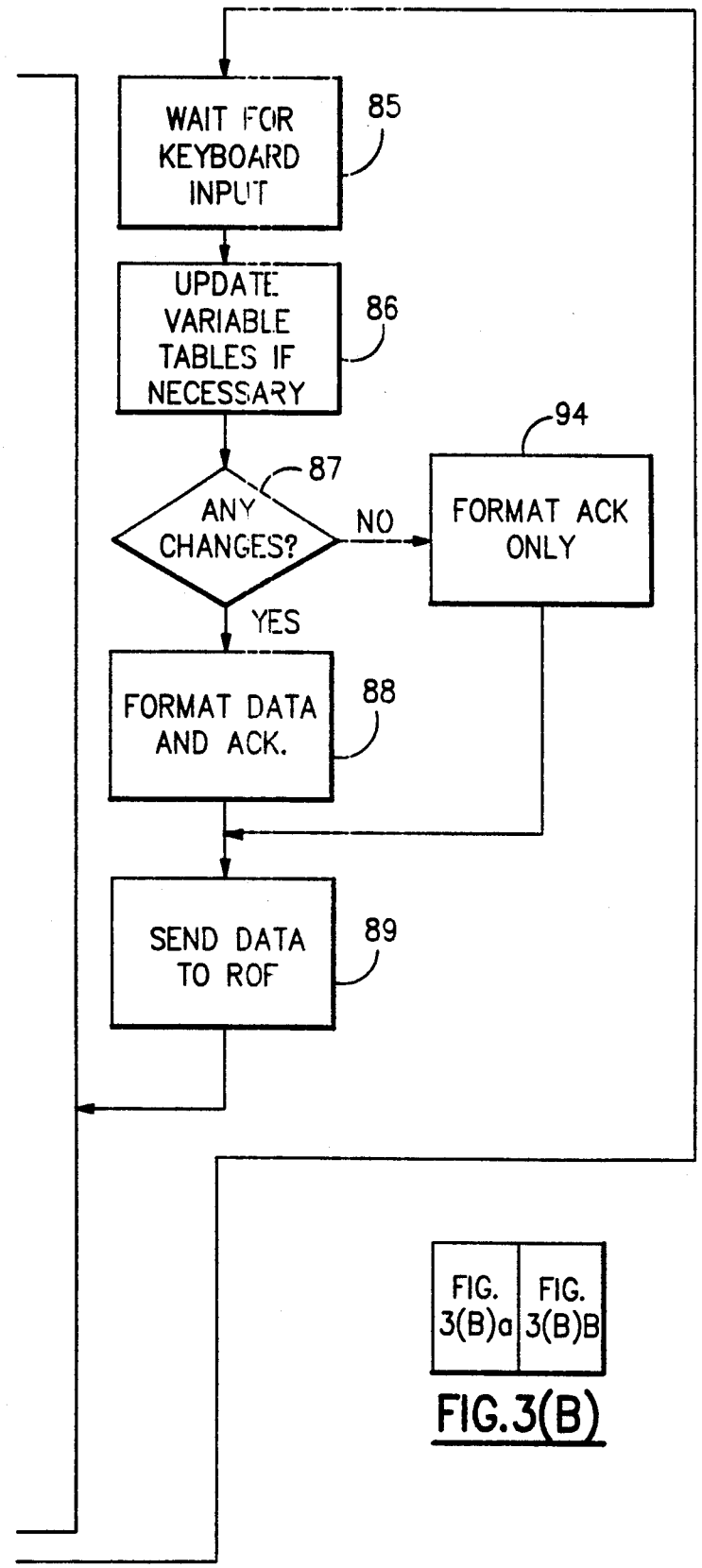
Figure 4A:
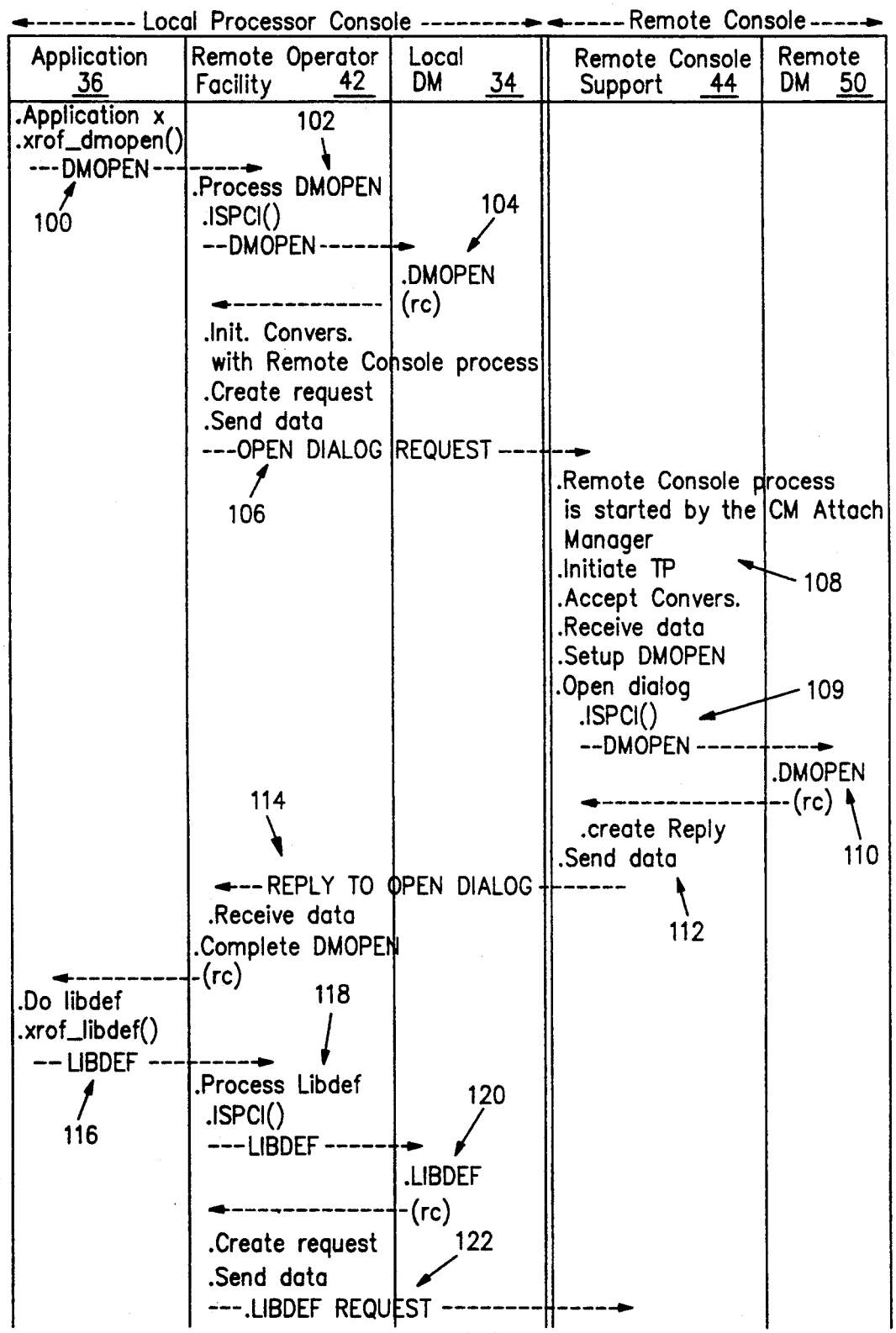
FIGS. 4(a) through (g) constitute a lower level flow graph further defining the aforesaid processes illustrated by FIGS. 3 (A) and (B).
Figure 4B:
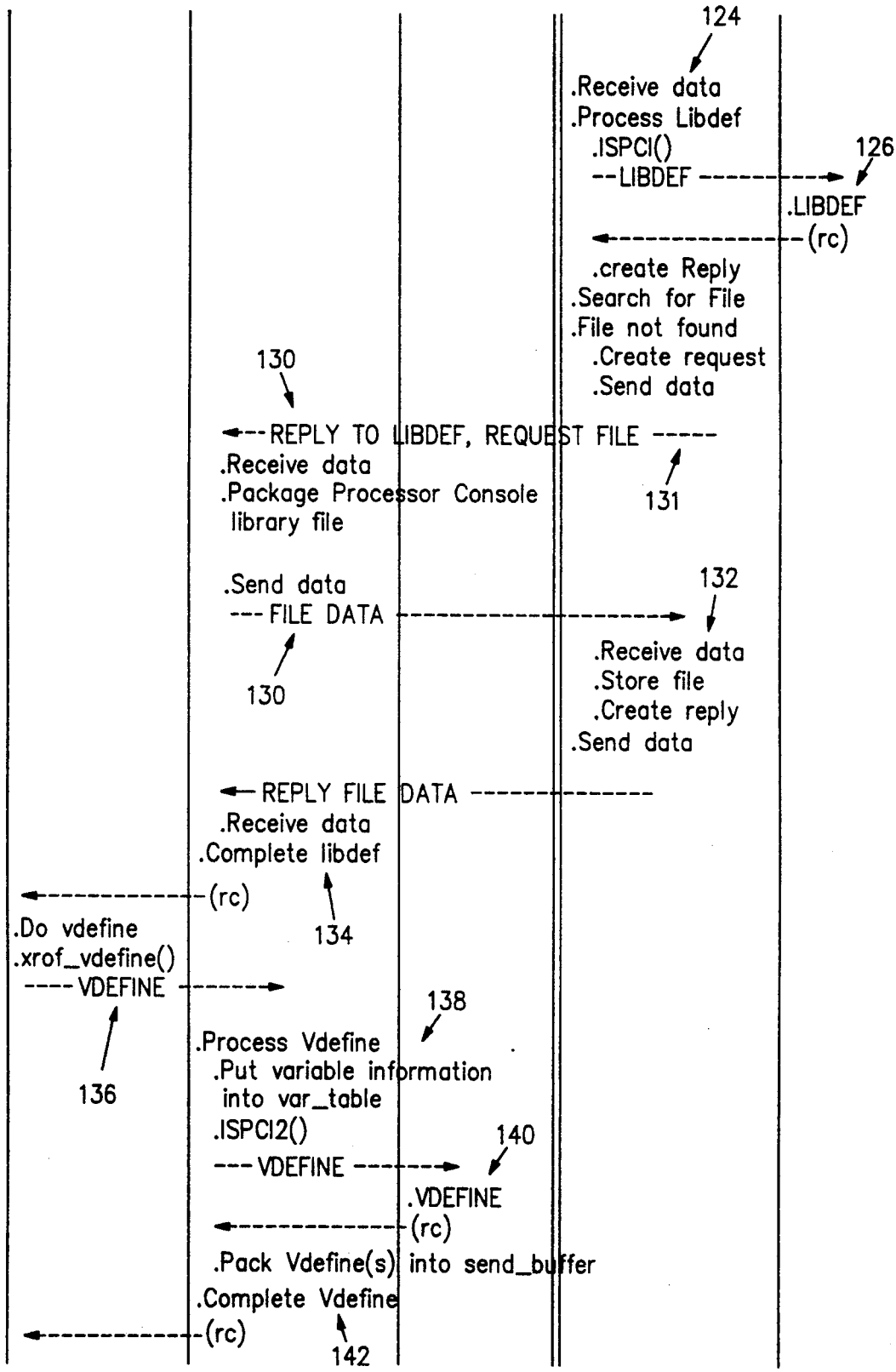
Figure 4C:
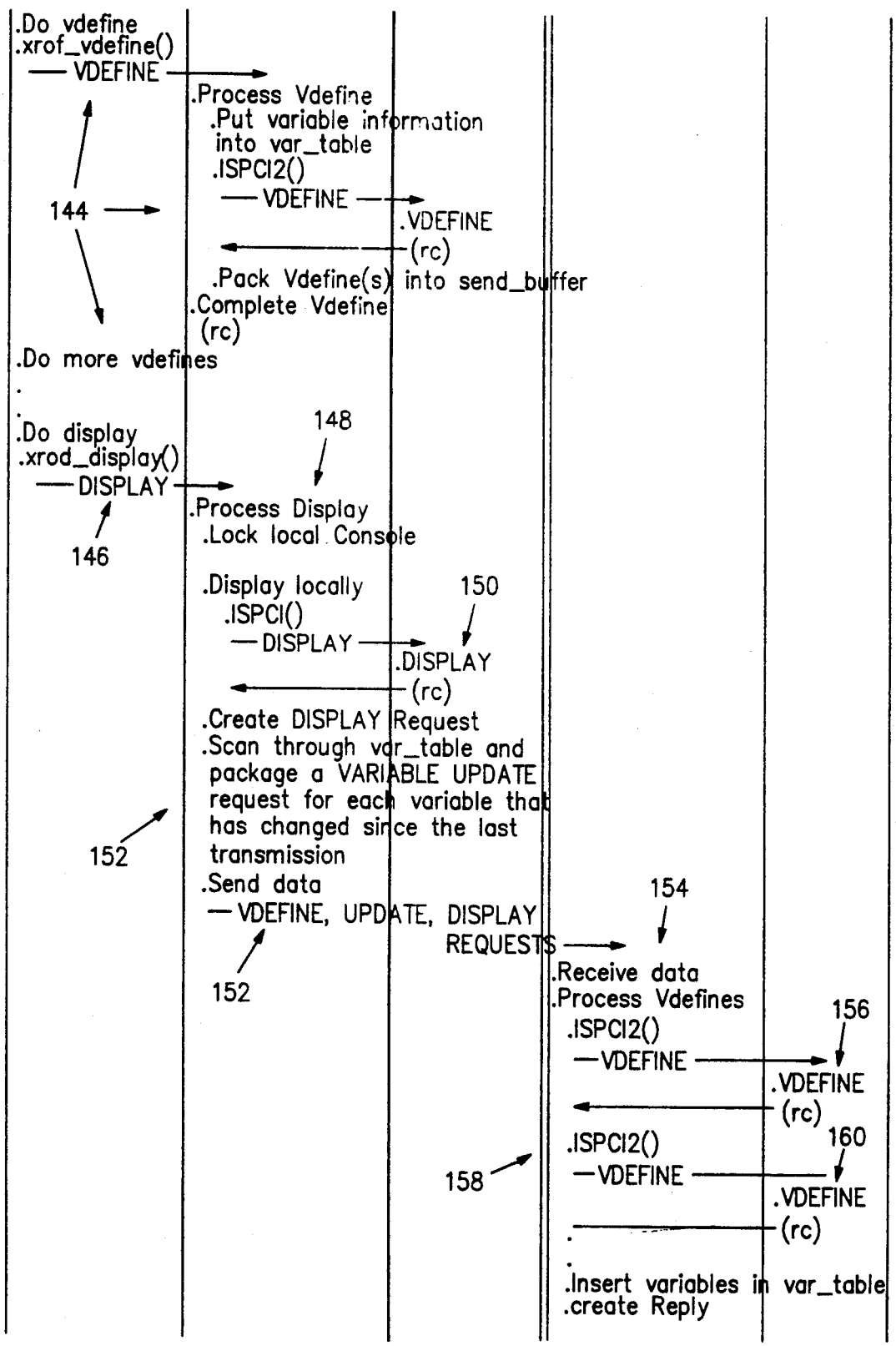
Figure 4D:
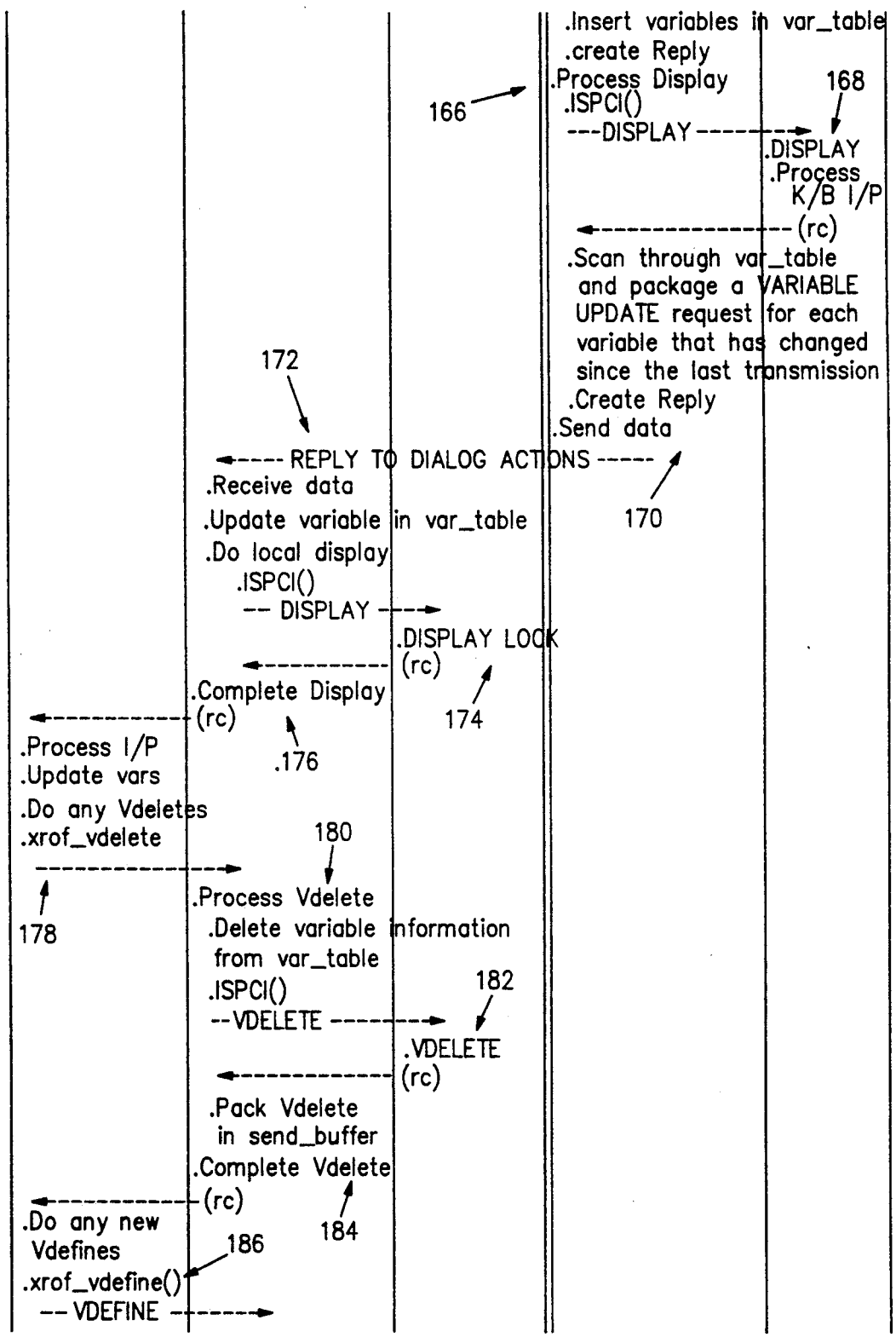
Figure 4E:
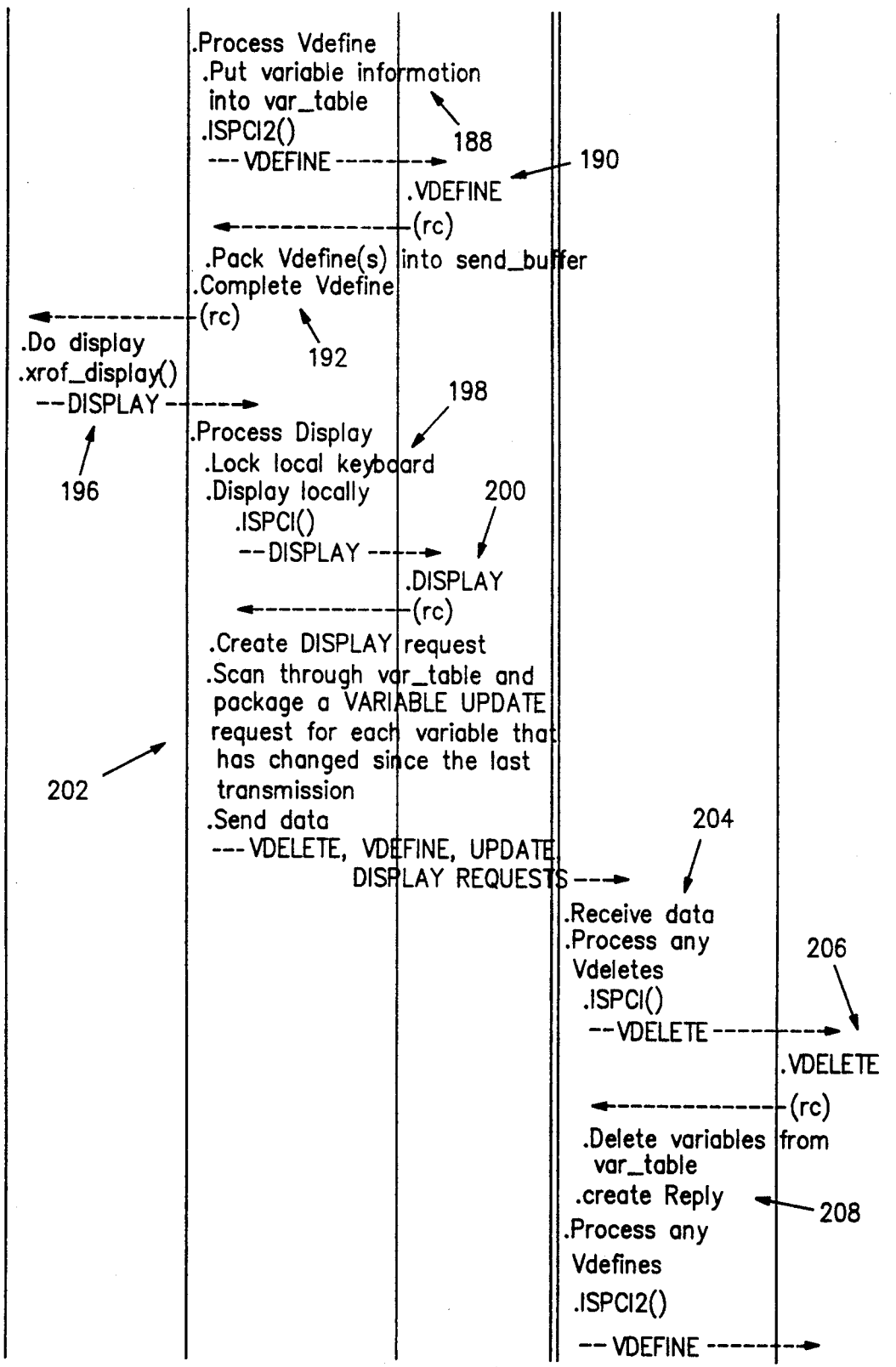
Figure 4F:
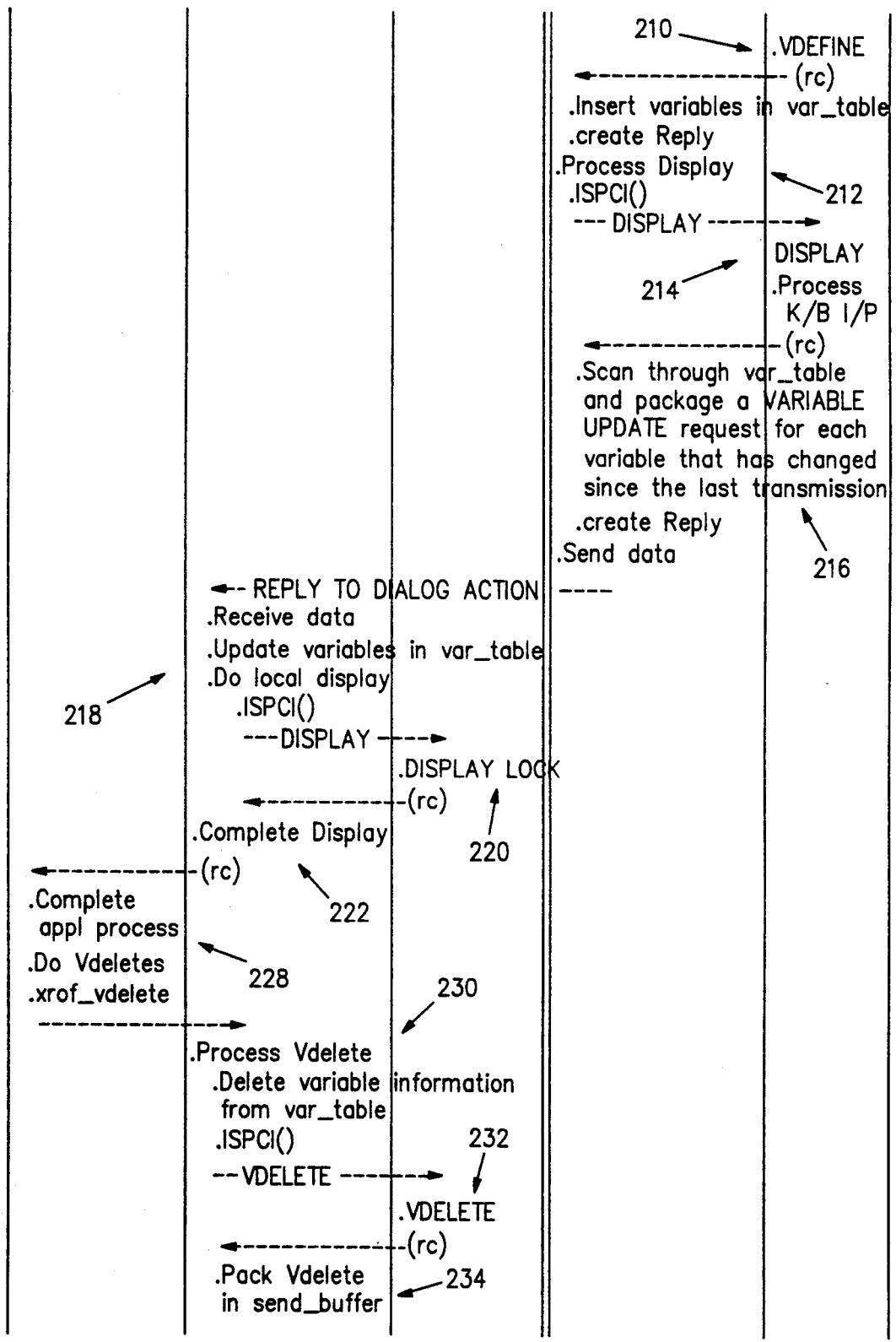
Figure 4G:
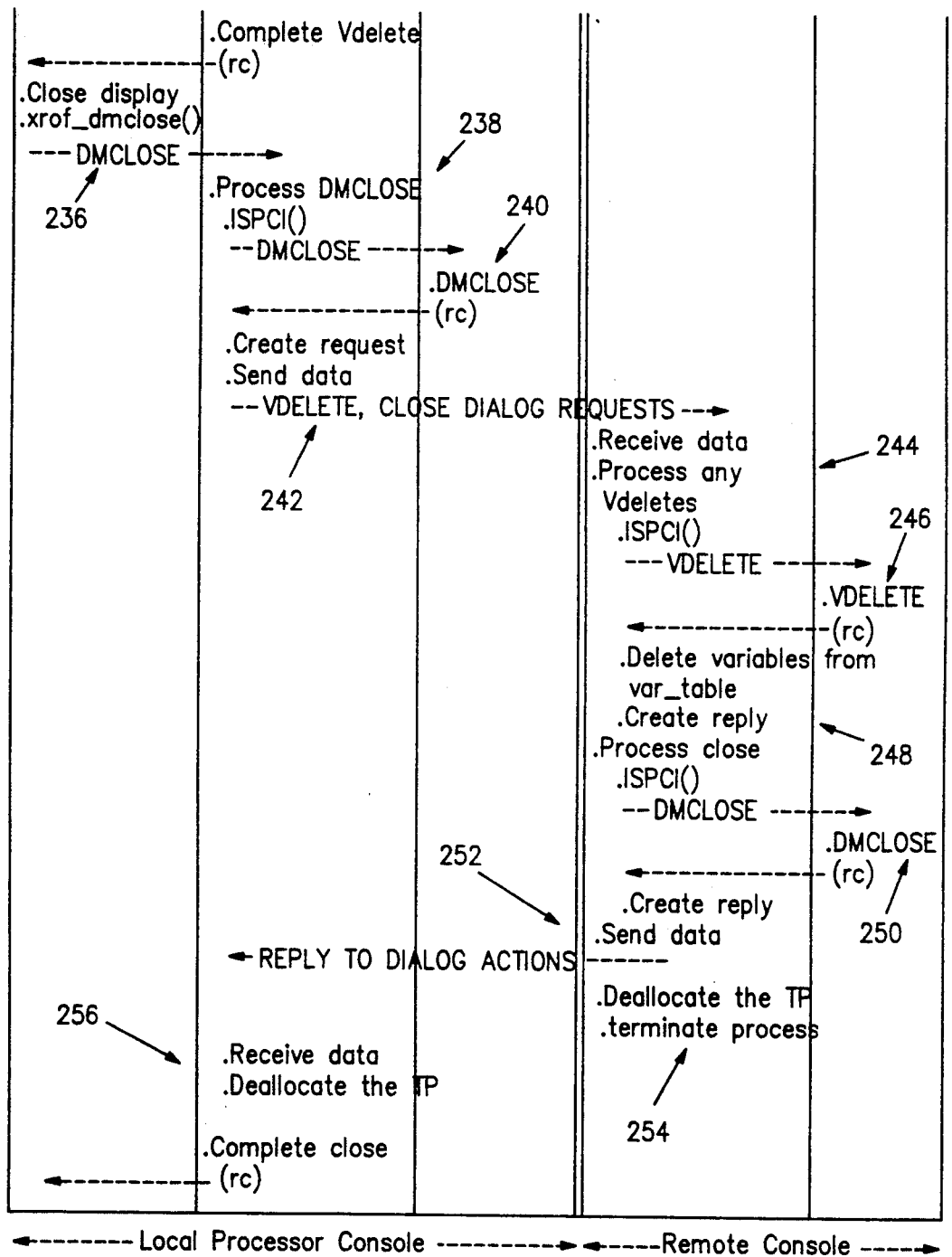

When application 36 desires to interact with a user to obtain control information or display a panel containing information, the application makes a call to a remote operator facility 42 (step 60 of FIG. 3 (A)), and remote operator facility 42 receives the call (step 61). In the illustrated embodiment, remote operator facility 42 comprises microcode running on top of the operating system but alternately could comprise hardware. It should be noted that no significant changes are required to application 36 to utilize remote operating facility 42 and operating systems 15 and 17 can be standard; application 36 need only address remote operating facility 42 with the call instead of Dialog Manager program 34. Although in the illustrated example, both remote processor console 16 and local processor console 14 are the same type with the same type of operating system, they could also be different types with different types of operating systems such as System/370 with VM Operating System. In the illustrated example, remote processor console 16 is active (decision block 62), and Dialog Manager program 34 locks out or disables local keyboard 32 to prevent conflicting or interfering input from keyboard 32 (step 63). The call may define or update a variable for a panel, and if so, the remote operator facility stores in a variable table 137 (RAM), the name of the variable, the address where the actual variable data is located in a RAM 40, and the current value of the variable data (step 64). The actual variable data is stored first in variable Table 137 so that when application 36 orders the variable sent for display, remote operator facility 42 first compares the data stored in variable Table 137 to that stored in RAM 40, and only if the two values differ does remote operator facility 42 transmit the data to remote processor console 16 (and update RAM 40). This further minimizes the amount of requisite data transmission. Next, remote operator facility 42 reformats the variable data for transmission to remote processor console 16 (step 65) (assuming that the data was updated), and obtains from application 36 an identification of the corresponding fixed template (step 66). The actual template is stored in a library 38 and usually is stored in a library 52 in the remote processor console. As described in more detail below, the information of step 64-66 is buffered for block transfer (decision block 67). If the aforesaid variable is updated but all variables are not yet defined, decision block 67 leads to step 68 in which the call from application 36 is passed to local Dialog Manager program 34 to update or define another variable. Steps 61-66 are repeated until all variables are defined. Then decision block 67 leads to step 69 in which remote operator facility 42 transmits the variable information and template identification to remote processor console support 44 in remote processor console 16 via local communication facility 46, telephone line 22 and remote communication facility 48 (step 69). By way of example, local communication facility 46 and remote communication facility 48 each comprises a Synchronous Data Link Communication (SDLC) adapter and associated SDLC device driver programs. It should be noted that remote operator facility converts the operating system type of call from application 36 to "raw" data form as described in more detail below for transmission to remote processor console 16. This facilitates interface to different types of remote consoles or an application program 171 which simulates a remote operator. Then, remote operator facility 42 waits for data (for example keyboard inputs responsive to the panel) from remote processor console support 44 (step 70). Remote processor console support 44 receives the transmission from communication facility 48 (step 71 of FIG. 3 (B)) and updates a variable table 165 with variable name, address of the variable data in a RAM 155, and the actual variable data (step 72) if necessary. Remote processor console support 44 also stores the actual variable data in a RAM 155. Next, remote processor console support 44 reconstructs the original call to Dialog Manager program 34 made by application 36 (step 73). In the illustrated example, the calls includes variable definitions and a panel display including an identification of a fixed template that is required for the display. As a result, (decision block 74) remote processor console support searches the hard disk 51 for the requisite template (step 75). It should be noted that the storage of identical template libraries simultaneously at both the local processor console and the remote processor console is made to reduce the amount of data that is transmitted between the local and remote consoles. This avoids repeated and time-consuming transmission of the template definition across telephone line 22. However, sometimes hard disk 37 is updated but hard disk 51 is not, and steps 71-73 represent the first usage of the template at the remote processor console 16, or steps 71-73 represent the first usage at the remote processor console since a template revision or update at the local processor console 14. In such a case, the proper template will not be found at the remote processor console disk 51 (decision block 76). As a result, remote processor console support 44 requests the template library from remote operator facility 42 via communication facilities 48 and 46 and telephone line 22 (step 77) and waits for the file (step 78). Remote operator facility 78 receives this request (step 80), retrieves the template library 38 definition or file from disk 37, and transmits the template library definition to remote processor console support (decision block 81 and step 82). Next, remote processor console support 44 receives the template library definition (step 79), and updates the disk 51. It should be noted that in the majority of instances, the requisite template library was previously stored on disk 51, and decision block 74 leads directly to step 83, but when it must be sent, it is sent automatically. Next, remote processor console support 44 issues a call to remote Dialog Manager program 50 to display the panel comprising the aforesaid fixed template and associated variable information, and remote Dialog Manager program 50 obtains the panel template from disk 51. It should be noted that the call which was reconstructed in step 73 and issued in step 83 is identical to the original call made by application 36 in step 60. The transmission of the raw call data across telephone line 22 instead of an operating system type of call permits a convenient interface to a variety of types of operating systems.

Next, remote processor console 16 can receive user input via remote keyboard 58 to remotely control application 36 running on local processor console 14 (decision block 84). If user input is necessary according to application 36 to, for example, update a variable, remote processor console support 44 waits for the keyboard input (step 85), and upon receipt updates variable table 165 with the actual variable data (located in RAM 155) (step 86). Because a variable is updated (decision block 87), remote processor console support 44 formats the variable information for transmission to remote operator facility 42 (step 88), and makes the transmission (step 89). The format is shown under Reply to Dialog Action (page 45). It should be noted that remote processor console support 44 only transmits changed variables to local processor console 14, after determining that the variable has been changed by comparing the contents of variables Table 165 to the contents of RAM 155. In response, remote operator facility 42 updates variable table 137 and RAM portion 40 during another iteration of steps 70, 80 and 81 and step 90. Then remote operator facility 42 calls local Dialog Manager program 34 with the new data (step 91). It should be noted that Dialog Manager program 34 processes the variable data provided by remote processor console 16 in the same manner as if the data was entered through local keyboard 32. This is because the keyboard data from corresponding keys on the local processor console and the remote processor console are targeted for the same location in RAM 40 (and can override each other). To complete the description of FIG. 3 (B), it should be noted that if no keyboard input was required after step 83, then decision block 84 leads to a step 93 in which simple acknowledgement with no data is sent to remote operator facility 42. Similarly, if there are no updated variables in step 86, then decision block 87 leads to a step 94 in which a simple acknowledgement with no data is formatted for subsequent transmission to remote operator facility 42.

As illustrated by the process of FIG. 3, application 36 can be remotely controlled by remote processor console keyboard 58, and the panels are displayed both at remote processor console screen 56 and local console screen 30 almost simultaneously. Also, a person at the local console 14 can view the operation of application 36 and also assist via other oral telephone connections with the remote processor console operator. FIGS. 2 and 3 also illustrate an optimization provided by remote operator facility 42 to minimize the amount of information transmitted across telephone line 22. Libraries 38 and 52 store the templates for the displays on local console display 30 and remote processor console display 56, respectively. When the libraries contain the necessary, identical templates for application 36, then information defining the templates need not be transmitted across telephone line 22. Only an identification of the template is required. When the remote collection of libraries 52 does not contain the template, then the template definition can be transmitted automatically to it from collection of libraries 38.

FIGS. 4(a)-4(e) illustrate specific examples of usage of system 10 to provide remote control by remote processor console 16, parallel display of panels on remote processor console screen 56 and local console screen 30, optimization of transmission across telephone line 22, and use of standard operating systems at both sides with flexibility to use different types of operating systems at both sides. Application 36 makes a call to remote operator facility 42 to open or start local Dialog Manager program 34 (step 100). The call is an application to application type of call and by way of example is a "C" function call in the form: xrof—dmopen(&dmcomm,buffer—len,buffer). This call starts an "open" function within remote operator facility 42 and causes remote operator facility 42 to initiate an interface function (ISPCI) which passes the open command to Dialog Manager program 34 (step 102). The call is an application to operating system type of call and by way of example is a "C" function call in the form of: ISPCI(&dmcomm,buffer—len,buffer). This command starts or opens the local Dialog Manager program 34, and in response, the local Dialog Manager program 34 transmits a return code to remote operator facility 42 indicating that the local Dialog Manager program has in fact been opened (step 104). Next, remote operator facility 42 initiates a conversation with remote processor console support 44 by transmitting a request to initiate communication facilities 46 and 48, i.e. begin a communication (step 106). After communication has been initiated, remote operator facility 42 transmits the appropriate data to remote processor console support 44 which, in this case, is the "open dialog request" (step 106). The remote processor console support 44 is started as a result of the receipt of the "open dialog request" which causes the remote communication facility 48 to initiate a transaction program which accepts the conversation from remote operator facility 42, receives the aforesaid data, and opens a dialog with remote Dialog Manager program 50 (step 108). Thus, remote processor console support 44 initiates an interface function for example, ISPCI(&dmcomm,buffer_len,buffer); to remote Dialog Manager program 50 and transmits an open dialog command to remote Dialog Manager program 50 (step 109). In response, remote Dialog Manager program 50 is started or opened, and transmits a return code to remote processor console support 44 indicating that it is started (step 110). Next, remote console support 44 creates a reply to remote operator facility 42 and sends data indicating that remote Dialog Manager program 50 was in fact opened (step 112). Next, remote operator facility 42 completes the original open command from step 100 by notifying application 36 that the Dialog Manager program has been opened. It should be noted that application 36 is unaware that two Dialog Manager programs 34 and 50 are involved in the transaction, and remote operator facility 42 is programmed in the illustrated embodiment to return a positive acknowledgment of Dialog Manager program open only if both Dialog Manager programs 34 and 50 have in fact been opened (step 114).

Next, application 36 selects a panel template for display and calls remote operator facility 42 for a command "LIBDEF" for example, a "C" function call of the form: xrof_libdef(&dmcomm,buffer_len,buffer) (step 116). Along with the command is an identification of a panel library containing at least the template or templates that will be used in subsequent "DISPLAY" commands. In response, remote operator facility 42 processes the library definition command by calling Dialog Manager program 34 with the command for example, ISPCI(&dmcomm,buffer_len,buffer), and the name of the corresponding file in libraries 38 that contains the template (step 118). In response, local Dialog Manager program 34 stores the name of the file in RAM, 40, and transmits an acknowledgement to remote operator facility 42 (step 120). Next, remote operator facility 42 creates a request to send the name of the library to remote processor console support 44 and then sends the request (step 122). Each transmission by local communication facility 46 requires a reformatting (ex. parallel to serial) for transmission over telephone line 22, and remote communication facility 48 converts the transmitted format back to the original (parallel) format for use by remote processor console support 44. In response, remote processor console support 44 calls remote Dialog Manager program 50 and provides the name of the library using an interface call, for example, |SPC|(&dmcomm,buffer_len,buffer) (step 124). Remote Dialog Manager program 50 then stores the name of the library and designates the library which contains the template as an active one (step 126). It should be noted that at this time, remote Dialog Manager program 50 does not verify that disk 51 actually contains the named library. Remote Dialog Manager program 50 also sends an acknowledgement to remote processor console support 44 that the library name has been received (step 126). Next, remote processor console support 44 searches for the library or the disk 51, and in the illustrated example, does not locate the file. Therefore, remote processor console support 44 creates a request to send the entire library, and sends the request to remote operator facility 42 (step 128). It should be noted that such a need for the entire library occurs when disk 37 has been updated or replaced by a different disk. Remote operator facility 42 receives the data indicating the name of the needed library and sends the library to remote processor console support 44 (step 130). In response, remote processor console support 44 receives the library and replies to remote operator facility 42 that the library has been received (step 132). Then, remote operator facility 42 returns an acknowledgement to application 36 that the library has been defined according to the command in step 116 (step 134).

Next, application 36 begins a process to define the variable information which should be inserted in the template (step 136). According to this process, application 36 calls remote operator facility 42 (step 136) with a command "VDEFINE" by way of example, a "C" function call of the form, xrof_vdefine(&dmcomm,buffer_len,buffer,parm1,parm2), and specifies variables by name and corresponding locations (i.e. memory addresses) in memory 40 which contain the current values of the variables. It should be noted that application 36, remote operator facility 42 and local Dialog Manager 34 all have direct access to memory 40. Remote operator facility 42 processes the "VDEFINE" command by storing the variable information in variable table 137 and calling local Dialog Manager 34 to define the variables and corresponding memory locations of the actual data (step 138). An example of this interface call is ISPCI2(&dmcomm,buffer_len,buffer,parm1,parm2). In response, local Dialog Manager 34 correlates the variable information with the corresponding fields and the corresponding templates, and sends an acknowledgement back to remote operator facility 42 (step 140). Next, remote operator facility 42 stores the variable information in a buffer for subsequent transmission to remote processor console support 44. It should be noted that the most economical use is made of telephone line 22 by buffering all of the variable information for a single block transmission (step 142) as described in more detail below. Also, the remote operator facility 42 transmits an acknowledgement to application 36 that the "VDEFINE" command of step 136 has been completed (step 142). In the illustrated example, steps 136-142 are repeated a number of iterations until all the variables have been defined (step 144).

Next, application 36 begins a process to display the previously defined panel template and variable information, and transmits the "DISPLAY" command to remote operator facility 42 (step 146). In response, remote operator facility facility 42 begins processing the display command by locking out local console keyboard 32 by making an operating system call. Also, remote operator facility 42 begins a process to display the panel on local console display 30 by transmitting the display command to local Dialog Manager program 34 (step 148) using interface call ISPCI. In response, the local Dialog Manager 34 makes the display of the panel including the template obtained from library 38 and variable information obtained from memory 40, and transmits an acknowledgement back to remote operating facility 42 (step 150). Simultaneously, remote operator facility 42 creates a display request for subsequent transmission to remote processor console facility 44 and display on remote console screen 56 (step 152). Also in step 152, remote operator facility scans variables table 137 to determine which variable information was changed after remote operator facility 42's previous access to memory 40. Only the changed variable information need be transmitted over telephone line 22, because the previously transmitted variable information is stored in memory 155 in remote processor console 16. Finally, remote operator facility 42 sends the display command, the contents of the buffer which stores the variable information that was updated since the buffer was last filled, and the panel template identification (step 152) to remote console support 44. In response, remote processor console support 44 processes the variables by assigning locations in memory 155 to correspond to each of the variables, and also transmits the variable information (i.e. variable names and addresses in memory 155) to remote Dialog Manager 50 (step 154). Remote Dialog Manager 50 stores the information and sends an acknowledgement back to remote processor console support 44 (step 156). Remote processor console support 44 sends to remote Dialog Manager program 50 the same type of information for additional variables, and remote Dialog Manager program 50 responds with acknowledgements in steps 158-160 until all the variable information has been processed. Next, remote processor console support 44 updates variable table 165 with the new variables received from remote operator facility 42 (step 166). Also in step 166, remote processor console support 44 sends a "display" command to remote Dialog Manager program 50, and in response, remote Dialog Manager program 50 reads memory 155 and causes the panel to be displayed on remote processor console screen 56 (step 168).

Next in step 168 in response to the panel display, an operator enters data and commands via remote processor console keyboard 58. It should be noted that variable information for the templates can be provided at the local processor console 14 by application 36 as described above or, at the remote processor console 16 by the operator using remote processor console keyboard 58 in step 168. Similarly, the data and commands entered at the remote processor console 16 can be provided by application program 171. The operator (or program) entries in step 168 are stored in memory 155 and the names of the variables which are updated in step 168 are sent to remote processor console support 44 which then updates variable table 165 to reflect the updates (step 170). Also in step 170, remote processor console support 44 transmits the updated variables to remote operator facility 42 which in turn stores the updated variable information in memory 40 and updates variable table 137 to identify the updated variables (step 172). Next, remote operator facility 42 transmits the "display" command to local Dialog Manager 34 which reads variable table 137 and memory 40 and updates local processor console display 30 with the user entered variable information and sends an acknowledgement to remote operator facility 42 (step 174). Next, remote operator facility 42 transmits an acknowledgement, and returns control to application 36 (step 176). In response, application 36 processes the keyboard inputs which processing yields further updates to the variable information in memory 40 and deletion of variables from variable table 137 which will not be used in the next display.

To make such deletions, application 36 transmits a "VDELETE" command to remote operator facility 42 (step 178), and remote operator facility 42 processes this command by deleting the variables from table 137 and calling local Dialog Manager 34 with the "VDELETE" verb (step 180). In response, local Dialog Manager 34 deletes the unneeded variables from variable table 137, and returns an acknowledgement to remote operator facility 42 (step 182). Next, remote operator facility 42 packages the names of the deleted variables into buffer 41 for subsequent transmission to remote processor console support 44, and returns control to application 36 (step 184). It should be noted that for reasons of economy of transmission on line 22, the "VDELETES" are not immediately transmitted to remote console support 44, but are held in a buffer with other Vdeletes and Vdefines until the next display command.

Next, application 36 initiates a procedure to define new variables and this procedure is implemented in steps 186, 188, 190 and 192 in the same way that variables were previously defined in steps 136, 138, 140 and 142 respectively. Next, application 36 initiates a procedure to display a panel with the new variable information in steps 196, 198, 200, 202, 204, 206, 208, 210, 212, 214, 216, 218, 220 and 222 in the same way that the foregoing panel with the original variable information was displayed in steps 146, 148, 150, 152, 154, 156, 158, 160, 166, 168, 170, 172, 174 and 176, respectively. Next, application 36 initiates procedures to complete the application processing including the deletion of variables in steps 228, 230, 232 and 234 in the same way that variables were deleted in steps 178, 180, 182 and 184, respectively.

Next, application 36 calls remote operator facility 42 with a "DMCLOSE" command using a function call of the form xrof_dmclose(&dmcomm,buffer_len,buffer), which will close both local Dialog Manager 34 and remote Dialog Manager 50 (step 236). In response, remote operator facility 42 transmits the "DMCLOSE" command to local Dialog Manager 34 (step 238) using an interface call of the form ISPCI(&dmcomm,buffer_len,buffer); and in response, local Dialog Manager 34 terminates or closes it operation (step 240). Control is returned to remote operator facility 42, and remote operator facility 42 creates a request to send data to remote processor console support 44 to "close" or stop the dialog (step 242). This data includes the variable deletions previously processed by local Dialog Manager 34 in steps 228-232 and the close command (step 242). In response, remote processor console support 44 processes the variable deletion command by deleting the variables from memory 155, and transmitting the variable delete verb to remote Dialog Manager 50 (step 244). Next, remote Dialog Manager 50 processes the variable delete verb by deleting unneeded variables from RAIVI 155 (step 246) and returns control to remote processor console support 44. In response, remote processor console support 44 deletes the appropriate variables from variable table 165, and then transmits the close command to remote Dialog Manager 50 (step 248) using an interface call of the form ISPCI(&dmcomm,buffer_len,buffer). In response, remote Dialog Manager 50 terminates or closes its operation, and returns control to remote processor console support 44 (step 250). Next, remote processor console support 44 transmits a reply to remote operator facility 42 that the Dialog Manager 50 has been closed (step 252) and then disconnects communication to remote operator facility 42 (step 254). In response, remote operator facility 42 disconnects communication to remote processor console 16 and returns control to application 36 (step 256).

The following is a list and description of the format of each of the communications between remote operator facility 42 and remote processor console support 44:

OPEN DIALOG

This request flows from the local processor console to the remote processor console to indicate that a new dialog is to be opened. This request would normally cause a new process in the remote to be started to handle the actions for this dialog.

The expected response is "Reply to Open Dialog".
The data sent includes:
Application ID
correlator, the application's Process ID.
The following is the data to be sent for an Open Dialog Request.

| | |
|---|---|
| x'03' x'01' | Request/Response ID |
| | 0301 = open dialog request |
| x'aaaaaaaa' | Dialog Information |
| | aaaaaaaa = Application ID |
| x'corr' | Correlator for application |
| | corr = Process ID |

REPLY TO OPEN DIALOG

This request flows from the remote processor console to the local processor console to indicate that the new dialog has been started. If the new dialog could not be started, a return code and a reason are returned.

The next expected request is "Request Dialog Action".

The data sent includes:
Completion code indicates success or failure of the open dialog request.
  Return code X'0000'=success, X'000C'=failure.
  Reason code 1 is the DM Return code from the DMOPEN service.
  Reason code 2 is the DM Reason code from the DMOPEN service.

The following is the data sent for a reply to Open Dialog request.

| | |
|---|---|
| x'03' x'81' | Request/Response ID |
| | 0381 = reply to open dialog |
| x'retc' | Condition code |
| | retc = return code |
| x'reascode' | Reason Code 1 |
| | reascode = reason code |
| x'reascode' | Reason Code 2 |
| | reascode = reason code |

REQUEST DIALOG ACTION

This request flows from the local processor console to the remote processor console to request that the remote processor console cause the dialog action to be accomplished. Normally this would be a request for one or more of the following:
1. Define variable names and initialize values
2. Delete variable names
3. Update variable values
4. Lock or unlock the next display
5. Sound an alarm on the next display
6. Display a panel
7. Add a popup
8. Remove a popup
9. Force the current displayed panel to exit
10. Define panel libraries.

The expected response is a "Reply to Dialog Action". If the Dialog Manager needs a file to support the dialog, any number of "Request File" requests may occur before the "Reply to Dialog Action".

The data sent for deleting a variable name (R/R id = X'0303') is:
  number of variables to be deleted
  n names of variables to be deleted The data sent for defining a variable name and initializing the value (R/R id)= X'0304') is:
  number of variables to be defined
    continuation indicator to allow a large variable to be split
    data type
    type qualifier (for dimensions)
    max data length
    name of variable to be defined
    length of initial data
    initial data The data sent for updating variable data (R/R id = X'0305') is:
  number of variables to be updated
  followed by n
    continuation indicator
    name of variable to be updated
    length of data
    value for variable The data sent to display a panel (R/R id X'0307') is:
  name of panel to be displayed
  message id to display if this is not a panel display
  message location
  element name for cursor position on the panel
  index into field for cursor positioning
  character position of cursor.

The data to be sent to define libraries (R/R id = X'030A') is:
  library type: help, or panel
  number of libraries to be defined
  n names of libraries The data to be sent to force a panel to exit (R/R id = X'030E') is:
  correlator, the application's Process ID
  type of action requested: force, or clear pending force.

The following is the data to be sent for a Dialog Action Request.

| | |
|---|---|
| x'03' x'03' | Request/Response ID |
| | 0303 = delete names |
| x'nnnn' | Number of names following |
| | nnnn = number of names to be deleted |
| c'deltname'x'00' | Name of variable to be deleted |
| | terminated by null, padded by nulls |

The name field is repeated nnnn times

| | |
|---|---|
| x'03' x'04' | Action code |
| | 0304 = define names |
| x'nnnn' | Number of define groups following |
| | nnnn = number of names to be defined |
| x'nn' | Continuation indicator |
| | 00 = only; 01 = first; 02 = middle; 03 = last |
| x'tt' | Data type for name being defined |
| | tt = data type |
| | 01 = CHAR |
| | 02 = FIXED |

|  |  |
|---|---|
|  | 03 = FIXEDS |
|  | 04 = FIXEDU |
|  | 05 = BIT |
|  | 06 = HEX |
|  | 07 = DBCS |
|  | 08 = MIXED |
|  | 09 = BINSTR |
|  | 0A = PACK |
| x'nnnn' | Type qualifier |
|  | nnnn = qualifier for DIM |
| x'11111111' | Max data length for name being defined |
|  | 11111111 = max length |
| c'name ... 'x'00' | Name of variable to be defined |
|  | terminated by null, padded by nulls |
| x'1111' | Length of variable data |
| x'data ...' | Initial Variable data |

The variable information is repeated nnnn times

| | |
|---|---|
| x'03' x'05' | Action code |
|  | 0305 = update variable data |
| x'nnnn' | Number of names following |
|  | nnnn = number of names |
| x'nn' | Continuation indicator |
|  | 00 = only; 01 = first; 02 = middle; 03 = last |
| c'name ... 'x'00' | Name of variable to be updated |
|  | terminated by null, padded by nulls |
| x'1111' | Length of variable data |
| x'data ...' | Variable data |

The name, length and variable data is repeated nnnn times.

| | |
|---|---|
| x'03' x'06' | Action code |
|  | 0306 = lock K/B; 0346 = unlock K/B |
| x'03' x'07' | Action code |
|  | 0307 = display panel |
| c'name ... 'x'00' | Name of panel to be displayed |
|  | terminated by null, padded by nulls |
| c'msgid ... 'x'00' | Name of the message id |
|  | terminated by null, padded by nulls |
| c'msgloc ... 'x'00' | Panel element name for message location |
|  | terminated by null, padded by nulls |
| c'cursor ... 'x'00' | Panel element name for cursor |
|  | positioning terminated by null, padded |
|  | by nulls |
| x'nnnn' | Index for cursor positioning |
|  | nnnn = index into field |
| x'nnnn' | Character position for cursor positioning |
|  | nnnn = character positioning |
| x'03' x'08' | Action code |
|  | 0308 = add pop |
| c'popuploc'x'00' | Name of variable for popup positioning |
|  | terminated by null, padded by nulls |
| x'03' x'09' | Remove POP |
|  | 0309 = remove pop |
| x'03' x'0A' | Action code |
|  | 030A = Define libraries |
| x'nn' | Library type indicator |
|  | 01 = Panel |
|  | 02 = Help |
| x'nnnn' | Number of library names following |
|  | nnnn = number of names |
| c'libname ... 'x'00' | Name of library to be defined |
|  | terminated by null, padded by nulls |

The library name field is repeated nnnn times.

| | |
|---|---|
| x'03' x'0B' | Action code |
|  | 030B = sound alarm on next |
|  | display |
| 0'03' x'0E' | Action code |
|  | 030E = force the current display |
| x'corr' | nnnn = Process ID |
| x'nn' | Type indicator |

|  |  |
|---|---|
|  | 01 = force display |
|  | 02 = clear pending force |

REPLY TO DIALOG ACTION

This request flows from the remote processor console to the local processor console to indicate that the dialog action has completed. Normally this would mean that the operator performed some action that caused the Dialog Manager to return control to the application.

The next expected request is another "Request Dialog Action" or a "Request Close Dialog".

The data sent includes:

Completion code contains the return code information.

Return code = X'0000' indicates success or X'000C' indicates an error.

Reason code 1 is the DM Return code from the requested service.

Reason code 2 is the DM Reason code from the requested service.

The following information is required only when the request was a display number of updated variables and for each:

name of updated variable length of the variable value of updated variable.

The following is the data to be sent for a reply to Dialog Action Request.

| | |
|---|---|
| x'03' x'8s' | Request/Response Id |
|  | 03 = dialog action; 8s = reply to action 's' |
|  | 3 = delete |
|  | 4 = define |
|  | 5 = update |
|  | 6 = lock |
|  | 7 = display |
|  | 8 = add pop |
|  | 9 = remove pop |
|  | A = define libraries |
|  | B = display w/alarm |
|  | E = force display |
| x'retc' | Condition code |
|  | retc = return code |
| x'reascd_1' | Reason code 1 |
|  | reascode = reason code |
| x'reascd_2' | Reason code 2 |
|  | reascode = reason code |
| x'nnnn' | Number of names following |
|  | nnnn = number of names |
| c'name ... 'x'00' | Name of variable to be deleted |
|  | terminated by null, padded by nulls |
| x'1111' | Length of variable data |
| x'data ...' | Variable data |

The name, length and variable data is repeated nnnn times.

REQUEST FILE

This request flows from the remote processor console to local processor console to request that a necessary file be sent to the remote processor console and stored temporarily there. The file could be the name of a panel library file, a help library file, a message file, a key definition file, or any other file needed by the Dialog Manager.

The expected response is a "Reply to Request File".

The data sent includes:

the file name

The following is the data to be sent for a Request File Request.

| | | |
|---|---|---|
| x'05' x'02' | Request/Response Id | |
| | 0502 = request file | |
| c'name ... 'x'00' | Name of file to be retrieved | |

REPLY TO REQUEST FILE

This request flows from the local processor console to the remote processor console to carry the requested file.

The next expected request is either another Request File or a Reply to Dialog Action.

The data sent includes:
the date of the local processor console file
the timestamp of the local processor console file
an indicator of whether the file was tersed
segmentation data (to allow files to be broken into pieces
the file name
the length of the original file
the file data, possibly broken into pieces The following is the data to be sent for a Request File Reply.

| | | |
|---|---|---|
| x'05' x'82' | Request/Response Id | |
| | 0582 = request file | |
| x'date' | File date | |
| x'time' | File timestamp | |
| x'ti' | Tersed indicator | |
| x'sc' | Segmentation code | |
| | 01 = first; 02 = middle; 03 = last; 00 = only | |
| c'name ... 'x'00' | File name | |
| x'len.' | File Length | |
| x'data ...' | Variable data | |

CLOSE DIALOG

This request flows from the local processor console to the remote processor console to indicate that the dialog actions are complete. This would mean that the remote processor console could terminate the process for this dialog.

The expected response is "Reply to Close Dialog".
The data sent includes:
a reason code for closing the dialog.
The following is the data to be sent.

| | | |
|---|---|---|
| x'03' x'02' | Request/Response Id | |
| | 0302 = close dialog request | |
| x'retc' | Condition code | |
| | retc = return code | |
| x'reascode' | Reason Code | |
| | reascode = reason code | |

REPLY TO CLOSE DIALOG

This request flows from the remote processor console to the local processor console to indicate that the dialog has been closed.

The data sent includes:
Completion code contains return code information.
Return code = X'00' if successful, or X'0C' if there is an error.
Reason code contains the DM reason code.
The following is the data sent.

| | | |
|---|---|---|
| x'03' x'82' | Request/Response Id | |
| | 0382 = reply to close dialog | |
| x'retc' | Condition code | |
| | retc = return code | |
| x'reascode' | Reason code | |
| | reascode = reason code | |

Summary of Request/response IDs

| R/R ID | Description |
|---|---|
| 0301 | Open Dialog |
| 0381 | Reply to Open Dialog |
| 0302 | Close Dialog |
| 0382 | Reply to Close Dialog |
| 0303 | Dialog Action - Delete variable name |
| 0383 | Reply to Dialog Action - Delete variable name |
| 0304 | Dialog Action - Define variable name |
| 0384 | Reply to Dialog Action - Define variable name |
| 0305 | Dialog Action - Update variable data |
| 0385 | Reply to Dialog Action - Update variable data |
| 0306 | Dialog Action - Lock K/B |
| 0346 | Dialog Action - Unlock K/B |
| 0386 | Reply to Dialog Action - lock/unlock K/B |
| 0307 | Dialog Action - Display panel |
| 0387 | Reply to Dialog Action - Display Panel |
| 0308 | Dialog Action - Add Popup |
| 0388 | Reply to Dialog Action - Add Popup |
| 0309 | Dialog Action - Remove Popup |
| 0389 | Reply to Dialog Action - Remove Popup |
| 030A | Dialog Action - Define Libraries |
| 038A | Reply to Dialog Action - Define Libraries |
| 030B | Dialog Action - Alarm |
| 038B | Reply to Dialog Action - Alarm |
| 030E | Dialog Action - Force |
| 038E | Reply to Dialog Action - Force |
| 0502 | Request File Data |
| 0542 | File Data |
| 0582 | Reply to File Data |

Based on the foregoing, computer systems and processes according to the present invention have been disclosed. However, numerous modifications and substitutions can be made without deviating from the scope of the invention. For example, a complete program could be substituted for the remote console 16 and human operator to form a completed, automated operator for application 36. Therefore, the invention has been disclosed by way of illustration and not limitation, and reference should be made to the following claims to determine the scope of the invention.

We claim:

1. A computer system comprising:
a first processor console including a first display screen and a first keyboard means for entering first data;
first storage means, local to and serving said first processor console, for storing at least one panel template containing fixed panel information for display on said first display screen;
a second processor console including a second display screen, a second keyboard means for entering second data, and memory means for storing said second data;
second storage means, local to and serving said second processor console, for storing at least one panel template containing fixed panel information for display on said second display screen;
communication facility means, coupling said first processor console to said second processor console, for supporting communication between said first processor console and said second processor console;

first means, resident within said first processor console, for transmitting to said second processor console via said communication facility means an identification of a panel template for display on said second display screen; and second means, resident within said second processor console and coupled to said memory means, for receiving said panel template identification, determining if said panel template identification identifies a panel template stored in said second storage means, and if so, controlling said second display screen to display the identified panel template, and if not, requesting transmission of said identified pane template from said first storage means, said first means receiving and responding to said request from said second means by transmitting said identified panel template to said second storage means via said communication facility means, said second means fetching said identified panel template transmitted by said first means and stored in said second storage means and controlling said second display screen to display said identified panel template; and wherein said second means fetches said second data from said memory means and controls said second display screen to merge and display said second data with said identified panel template, and sends said second data to said first processor console via said communication facility means, said second means controlling said second display screen to merge and display said second data with said identified panel template in response to the entering of said second data from said second keyboard means without direction from said first processor console to merge and display said second data with said identified panel template;

said first means determines if variable information instead of said second data shall be merged and displayed with said identified panel template on said second display screen based on said second data received from said second processor console, and if so, sends said variable information to said second processor console, and said second means receives said variable information and controls said second display screen to merge and display said variable information with said identified panel template, and if not, does not send said variable information to said second processor console and said second data remains displayed.

2. A computer system as set forth in claim 1 wherein said first means controls said first display screen to display said identified panel template and responds to said receipt of said second data by controlling said first display screen to merge and display said second data with said identified panel template, and if said first means determines that variable information instead of said second data shall be merged and displayed with said identified panel template on said second display screen based on said second data received from said second processor console, said first means controls said first display screen to merge and display said variable information with said identified panel template.

3. A computer system as set forth in claim 1 wherein said second means overwrites said second data with said variable information in said memory means and on said second display screen.

4. A computer system as set forth in claim 1 wherein:
said first means comprises an application program executing within said first processor console, a first operating system means for controlling execution of said application program, and a remote operator facility means logically interposed between said application program and said first operating system means;

said second means comprises a second operating system means for controlling said second display screen, and a remote console support means;

said first operating system means makes a request to display said identified panel template;

said remote operator facility means receives said request, sends said request to said first operating system means and sends said request to said second processor console; and said remote console support means receives said request from said remote operator facility means, determines if said second storage means stores said identified panel template, and if not, requests said identified panel template from said first processor console, and if said second storage means stores said identified panel template or after said identified panel template is received from said first processor console, said remote console support means sends said request to said second operating system means.

5. A computer system as set forth in claim 4 wherein:
said remote console support means receives a notification that said second data has been entered from said second keyboard means, fetches said second data from said memory means and sends said second data to said first processor console.

6. A computer system as set forth in claim 1 wherein said communication facility means comprises a telephone line.

7. A computer system as set forth in claim 1 wherein said communication facility means comprises a local area network.

8. A computer system comprising:
a first processor console including a first display screen and a first keyboard means for entering first data;

first storage means, local to and serving said first processor console, for storing at least one panel template containing fixed panel information for display on said first display screen;

a second processor console including a second display screen, a second keyboard means for entering second data, and memory means for storing said second data;

second storage means, local to and serving said second processor console, for storing at least one panel template containing fixed panel information for display on said second display screen;

communication facility means, coupling said first processor console to said second processor console, for supporting communication between said first processor console and said second processor console;

first means, resident within said first processor console, for transmitting to said second processor console via said communication facility means an identification of a panel template for display on said second display screen; and second means, resident within said second processor console and coupled to said memory means, for receiving said panel template identification, determining if said panel template identification identifies a panel template stored in said second storage means, and if so, controlling said second display screen to display the identified panel template, and if not, requesting transmission of said identified panel template from said first storage means, said first means receiving and responding to said request from said second means by transmitting said identified panel template to said second storage means via said communication facility means, said second means fetching said identified panel template transmitted by said first means and stored in said second storage means and controlling said second display screen to display said identified panel template; and wherein said second means fetches said second data from said memory means and controls said second display screen to merge and display said second data with said identified panel template, and sends said second data to said first processor console via said communication facility means, said second means controlling said second display screen to merge and display said second data with said identified panel template in response to the entering of said second data from said second keyboard means without direction from said first processor console to merge and display said second data with said identified panel template;

said first means determines if another panel template shall be displayed on said second display screen instead of said identified panel template based on said second data received from said second processor console, and if so, sends an identification of said other panel template to said second processor console, and said second means receives said other panel template identification, determines if said other panel template identification identifies a panel template stored in said second storage means, controls said second display screen to display said other panel template if said second storage means stores said other identified panel template and requests transmission of said other identified panel template from said first storage means if said second storage means does not store said other identified panel template, said first means receives and responds to said request by transmitting said other identified panel template to said second storage means, if not, does not send an identification of another panel template to said second processor console, and said identified panel template remains displayed.

9. A computer system as set forth in claim 8 wherein said first means controls said first display screen to display said identified panel template and responds to said receipt of said second data by controlling said first display screen to merge and display said second data with said identified panel template, and if said first means determines that a panel template other than said identified panel template shall be displayed instead of said identified panel template on said second display screen based on said second data received from said second processor console, said first means fetches said other panel template from said first storage means and controls said first display screen to display said other panel template.

10. A computer system as set forth in claim 8 wherein:

said first means comprises an application program executing within said first processor console, a first operating system means for controlling execution of said application program, and a remote operator facility means logically interposed between said application program and said first operating system means;

said second means comprises a second operating system means for controlling said second display screen, and a remote console support means;

said first operating system means makes a request to display said identified panel template;

said remote operator facility means receives said request, sends said request to said first operating system means and sends said request to said second processor console; and said remote console support means receives said request from said remote operator facility means, determines if said second storage means stores said identified panel template, and if not, requests said identified panel template from said first processor console, and if said second storage means stores said identified panel template or after said identified panel template is received from said first processor console, said remote console support means sends said request to said second operating system means.

11. A computer system as set forth in claim 10 wherein:

said remote console support means receives a notification that said second data has been entered from said second keyboard, fetches said second data from said memory means and sends said second data to said first processor console.

12. A computer system as set forth in claim 8 wherein said communication facility means comprises a telephone line.

13. A computer system as set forth in claim 8 wherein said communication facility means comprises a local area network.

* * * * *